US008656952B2

(12) United States Patent
Arov

(10) Patent No.: US 8,656,952 B2
(45) Date of Patent: Feb. 25, 2014

(54) BEVERAGE FAUCET AND FLOW REDUCER

(75) Inventor: Gennady Arov, Bayside, WI (US)

(73) Assignee: Perlick Corporation, Milwaukee, WI (US)

( * ) Notice: Subject to any disclaimer, the term of this patent is extended or adjusted under 35 U.S.C. 154(b) by 326 days.

(21) Appl. No.: 12/893,855

(22) Filed: Sep. 29, 2010

(65) Prior Publication Data

US 2012/0073690 A1 Mar. 29, 2012

(51) Int. Cl.
*F16K 51/00* (2006.01)
(52) U.S. Cl.
USPC .......................................... 137/613; 137/801
(58) Field of Classification Search
USPC ........... 137/613, 801; 251/231, 235, 208, 209
See application file for complete search history.

(56) References Cited

U.S. PATENT DOCUMENTS

| 2,057,231 | A | * | 10/1936 | Dawson .................. 251/231 |
| 2,373,294 | A | * | 4/1945 | Cornelius ................ 137/600 |
| 2,575,658 | A | | 11/1951 | Del Nero |
| 2,899,170 | A | | 8/1959 | Cornelius |
| 3,291,441 | A | | 12/1966 | Hansen |
| 3,359,996 | A | | 12/1967 | Cornelius |
| 4,078,578 | A | | 3/1978 | Buchholz |
| 5,845,824 | A | * | 12/1998 | Weimer et al. ............ 222/641 |
| 6,189,745 | B1 | | 2/2001 | Frank |
| 6,626,420 | B2 | | 9/2003 | Amidzich |
| 8,066,257 | B2 | * | 11/2011 | Arov et al. ................. 251/231 |

* cited by examiner

*Primary Examiner* — Kevin Lee
(74) *Attorney, Agent, or Firm* — Quarles & Brady LLP

(57) ABSTRACT

A faucet including a flow reducing insert positioned within an interior of a faucet body, the body and insert having tapered portions that are configured to reduce flow through the faucet when the insert is moved downstream laterally with the body. The insert and the body further having straight portions downstream from the tapered portions with the straight portion including features that permit liquid passing between the tapered portions to flow into the interior and through a downstream end of the faucet. A flow reducer with an insert and interior walls similarly configured to the faucet above.

26 Claims, 20 Drawing Sheets

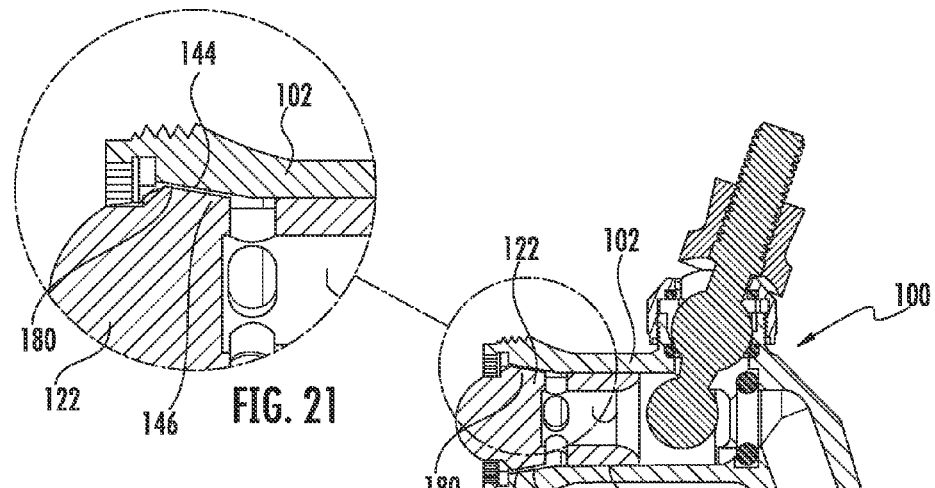
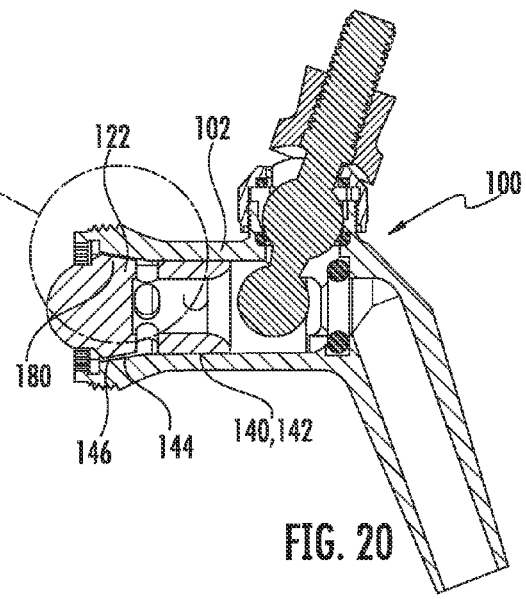
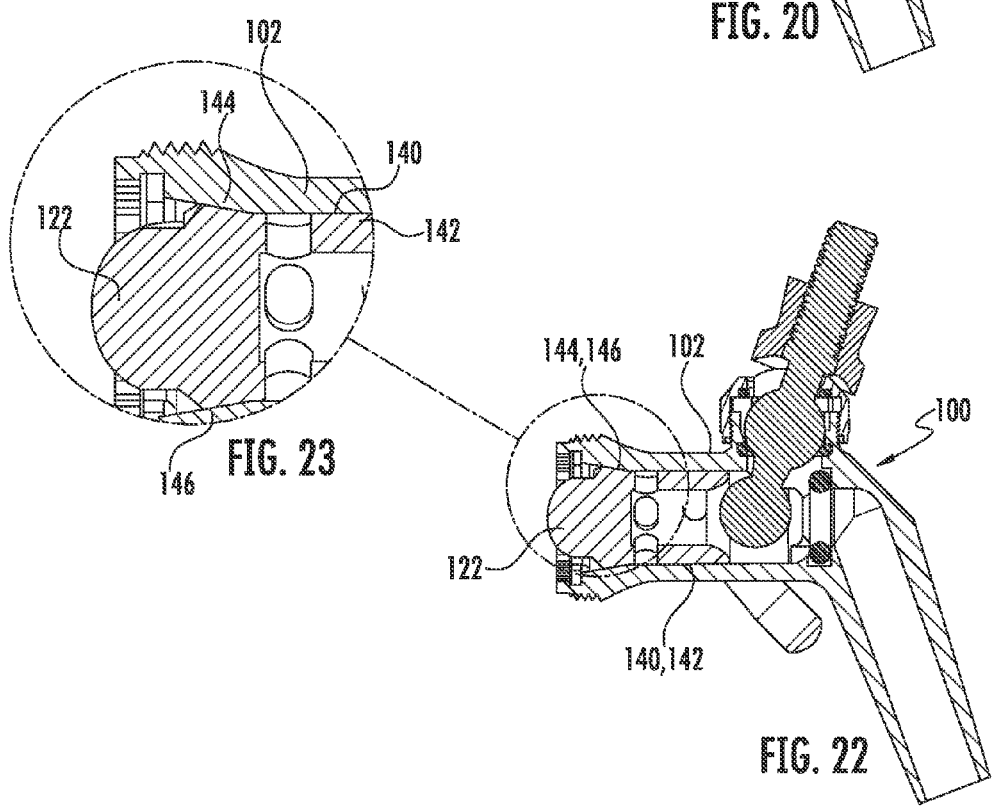

BEVERAGE FAUCET AND FLOW REDUCER

BACKGROUND

Conventional faucets used outside North America to dispense pressurized fluids, such as beer, generally have an external operating lever which actuates an internal valve to control the flow of the fluid under pressure. In North America conventional faucets generally do not have this feature to control the flow of fluid under pressure. For many vendors of beverages in North America, it may sometimes be necessary or desired to change the pressure in the beverage line from that pressure at which the system was originally designed to operate. When the pressure is changed the flow rate is changed as well. When the flow rates are either too fast or too slow beverages and in particular beer do not pour properly. When in line pressure is changed a flow adjusting devise at the faucet can change the flow rate at the faucet so that beer can be poured at a rate that is controllable in the glass and does not cause excessive foaming. Changes in pressures may be necessary when the type of beer being dispensed is served at a warmer or colder temperature than the system is designed for or when the beer being dispensed has higher or lower pressure requirements than the system was designed to provide.

Existing faucets with a flow control feature are significantly more expensive than faucets without a flow control feature which limits their use. In addition the flow control restricting devise on all flow control faucets is not integral to the faucet itself. It must be mated with a faucet shank that accommodates a cone like restricting devise that is adjusted by a lever on the faucet. The shank is built into the dispensing tower and is the devise that allows the faucet to be attached to the tower. The tower must be constructed in such a way as to accommodate the size of this special shank. Adding flow control faucets to a typical North American beer system requires that the tower be rebuilt or be replaced.

An alternative way to adjust the flow rate is to modify the flow reducer placed in the supply line through which the beverage flows to the faucet. While such a reducer is effective, it may not be readily adjusted. To gain access to the in line reducer which is generally located in the inside bar wall or against the bar wall itself a beer service technician must move the equipment to expose the insulated housing in which the in line flow reducer is located. The technician must then remove the insulation and disconnect the system. This is not a practical approach to changing the flow rate particular if the circumstance that initiates the pressure change is short term.

Another alternative is to place a flow control adaptor between the faucet and the shank. This adaptor in turn extends the faucet beyond the drip tray which catches any beer that drips from the faucet spout. In addition the beer within the adaptor and faucet are further than normal from the cooling block located in the tower. The beer can therefore warm up inside the adaptor and faucet causing the beer to foam when poured.

An additional problem with using all currently manufactured flow control faucet is that they must be regularly disassembled and cleaned. The valve seat that stops the beer flow on any currently sold flow control faucet is at the back of the faucet. The beer flows around the valve shaft and out the faucet spout. Because the valve shaft and the inside of the body of the faucet are downstream from the valve seat beer collects inside the body and on the valve shaft when beer flow stops. The beer in the body is exposed to air and as a result mold, yeast, and bacteria grows inside the faucet body. This must be removed every few week by disassembling the faucet, soaking it in cleaning solution, and brushing all internal parts.

It is desirable to have a less expensive flow control devise that is integral to the faucet and can be used with a standard faucet shank eliminating the need for a flow control faucet shank. It is also desirable to incorporate a front seat design into a flow control faucet so as to prevent the build up of mold, yeast, and bacteria in the body of the faucet. This would be a great improvement in the design of faucets for dispensing pressurized beverages and particularly beer to have a faucet that is more sanitary than current flow control faucets and that more readily permits the use of flow control faucets on North American style towers in order to accommodate any required in line pressure changes.

It is desirable to improve faucets for dispensing pressurized beverages to more readily permit the adjustment of flow rate of the beverage being dispensed.

BRIEF DESCRIPTION OF THE DRAWINGS

The accompanying drawings, which are incorporated in and constitute a part of the description, illustrate several aspects of the invention and together with the description, serve to explain the principles of the invention. A brief description of the drawings is as follows:

FIG. 20 is a side cross-sectional view of the faucet of FIG. 1 with the insert in an open position.

FIG. 21 is a closer view of a portion of the faucet of FIG. 20.

FIG. 22 is a side cross-sectional view of the faucet of FIG. 1, with the insert in a closed position.

FIG. 23 is a closer view of a portion of the faucet of FIG. 22.

DETAILED DESCRIPTION

Figure 1:
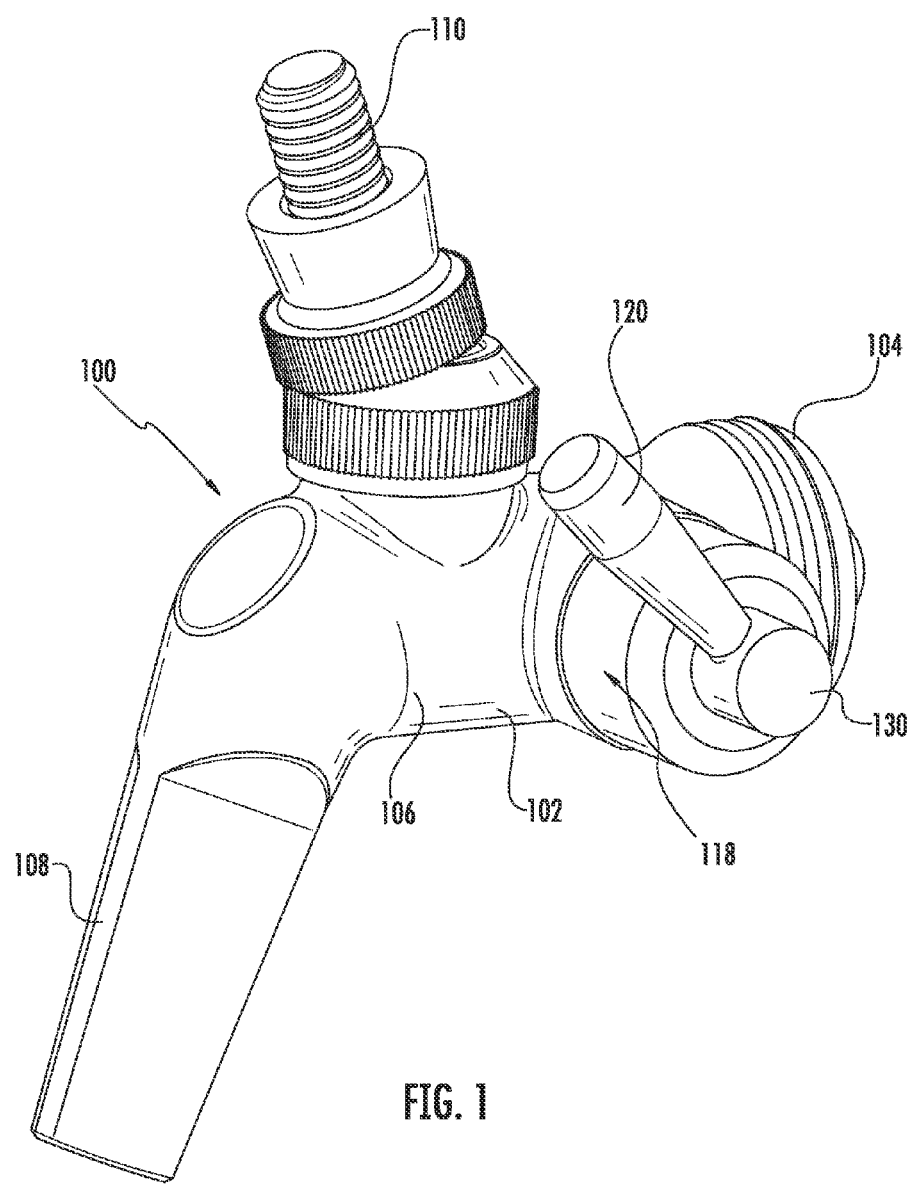
FIG. 1 is a perspective view of an improved faucet according to the present invention.
Figure 2:
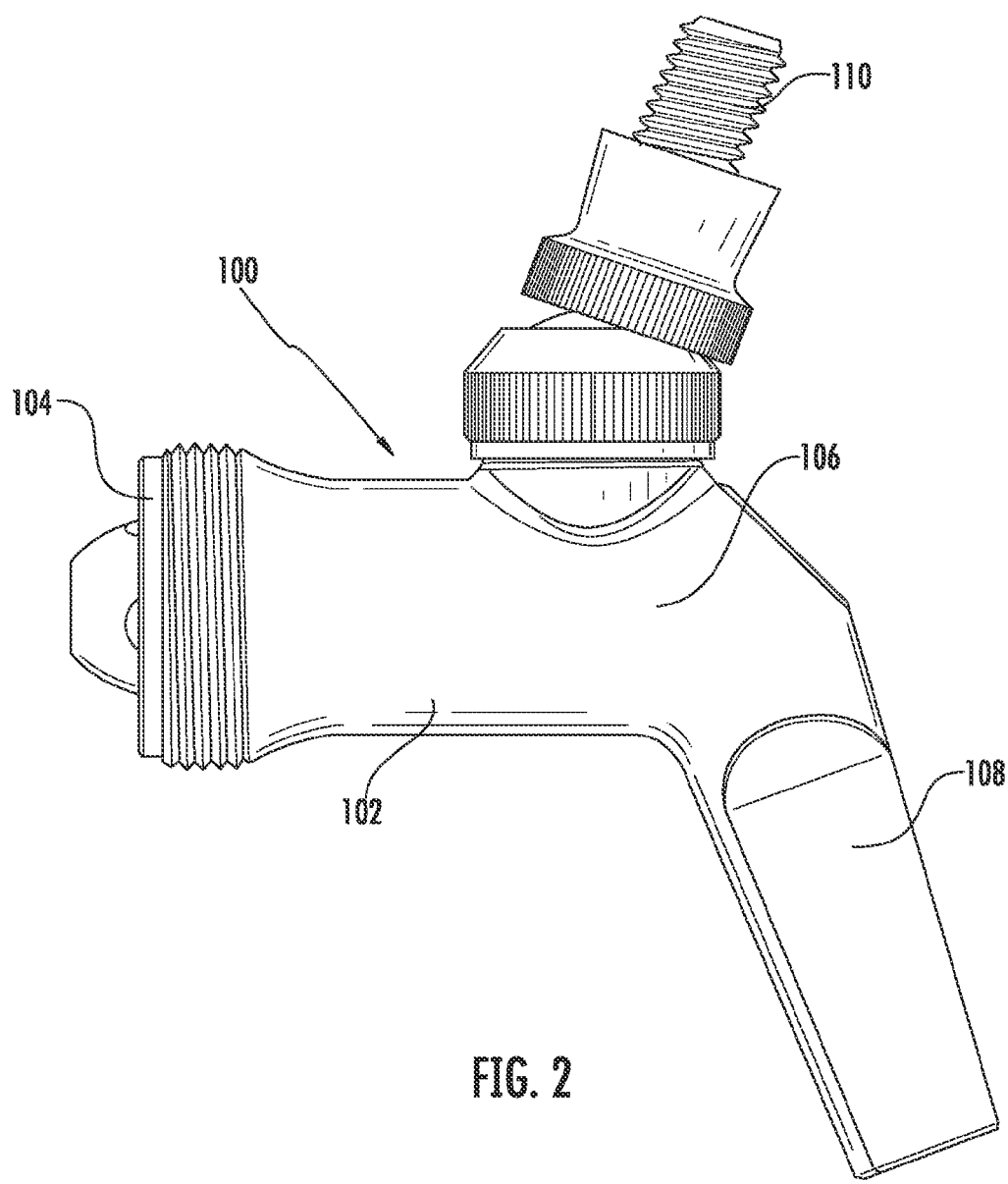
FIG. 2 is a side view of the faucet of FIG. 1.
Figure 3:
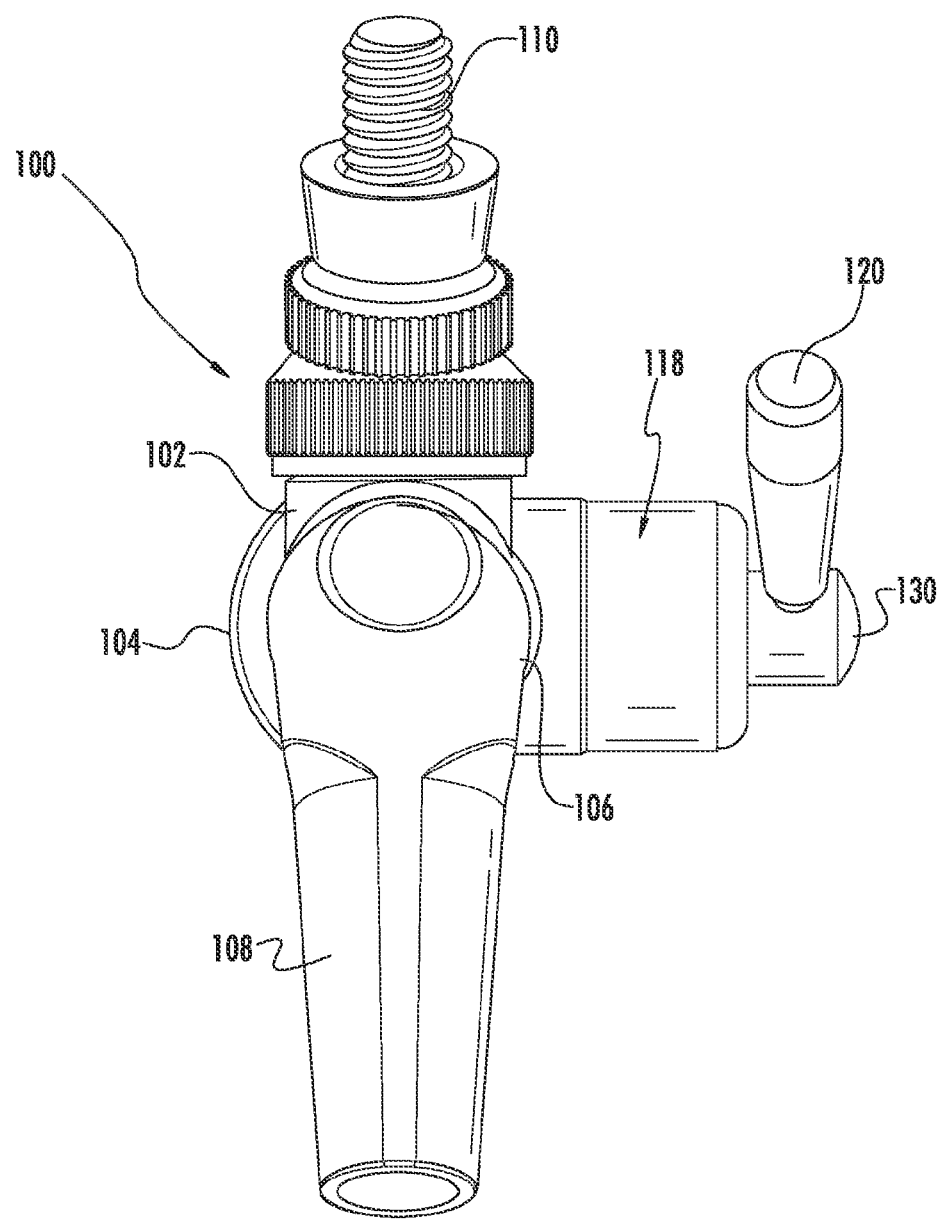
FIG. 3 is a front view of the faucet of FIG. 1.
Figure 4:
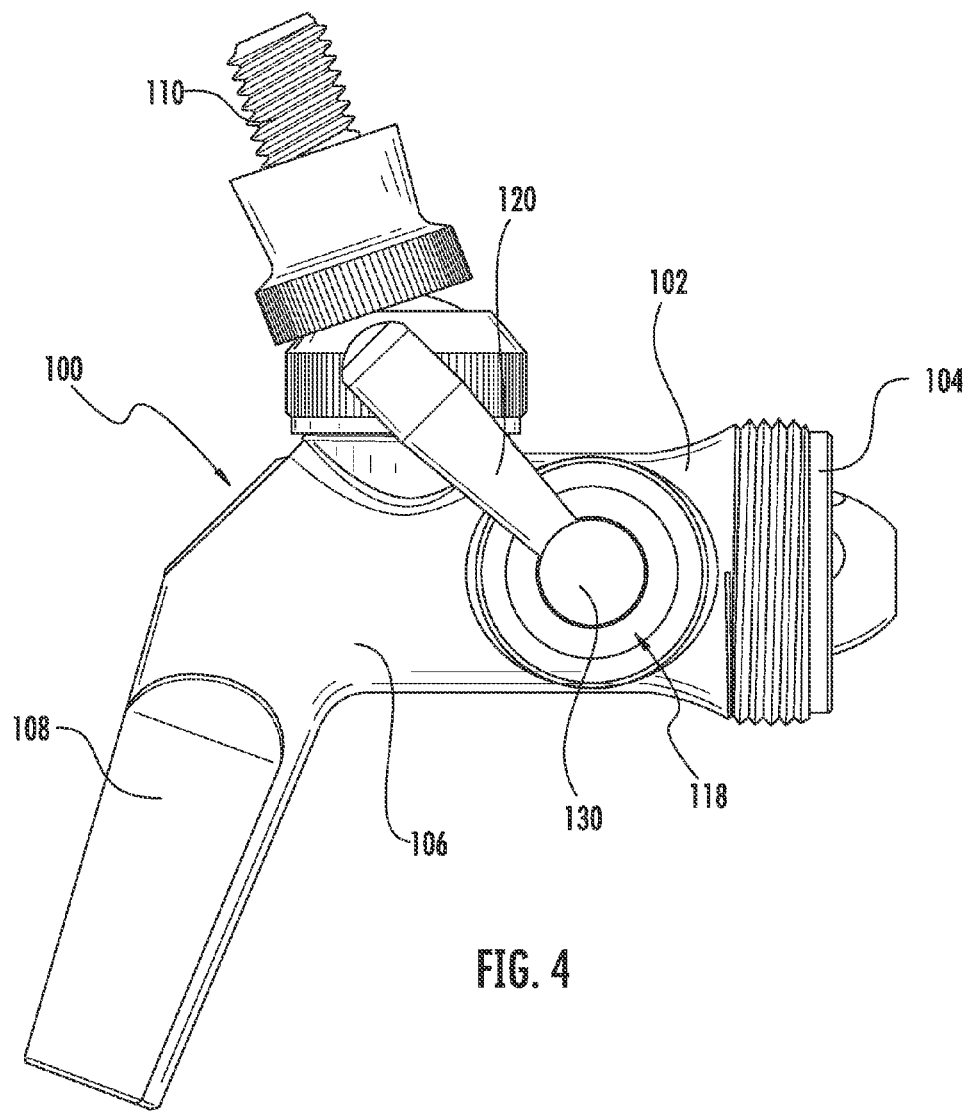
FIG. 4 is a second side view of the faucet of FIG. 1.
Figure 5:
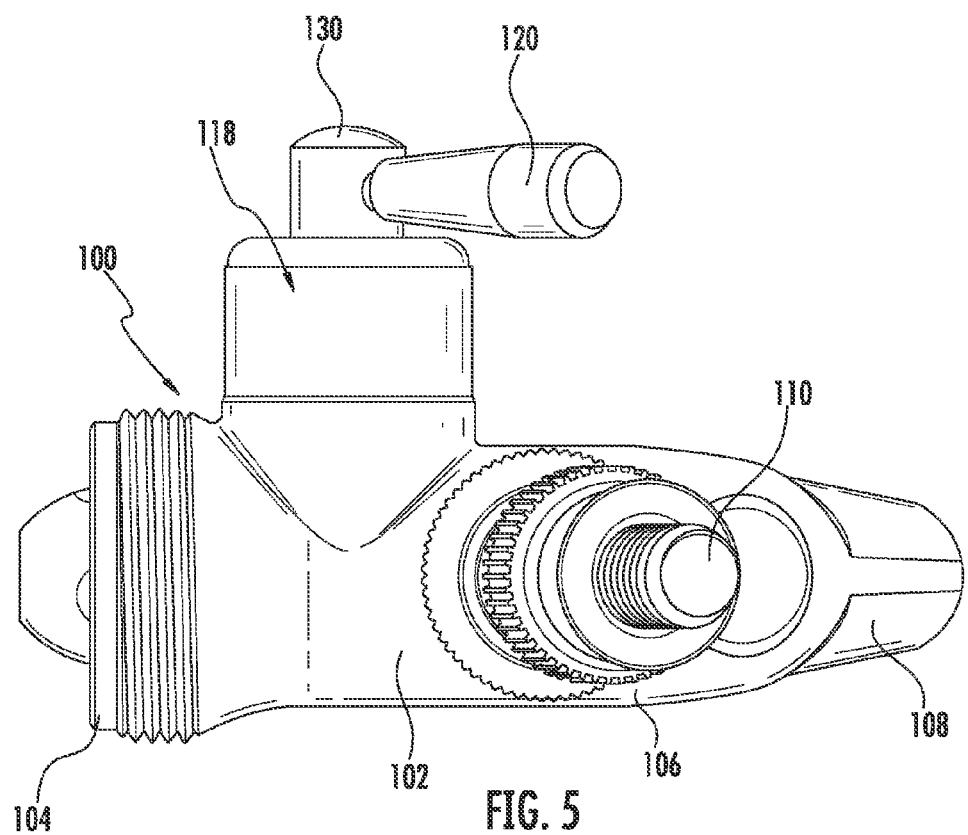
FIG. 5 is a top view of the faucet of FIG. 1.
Figure 6:
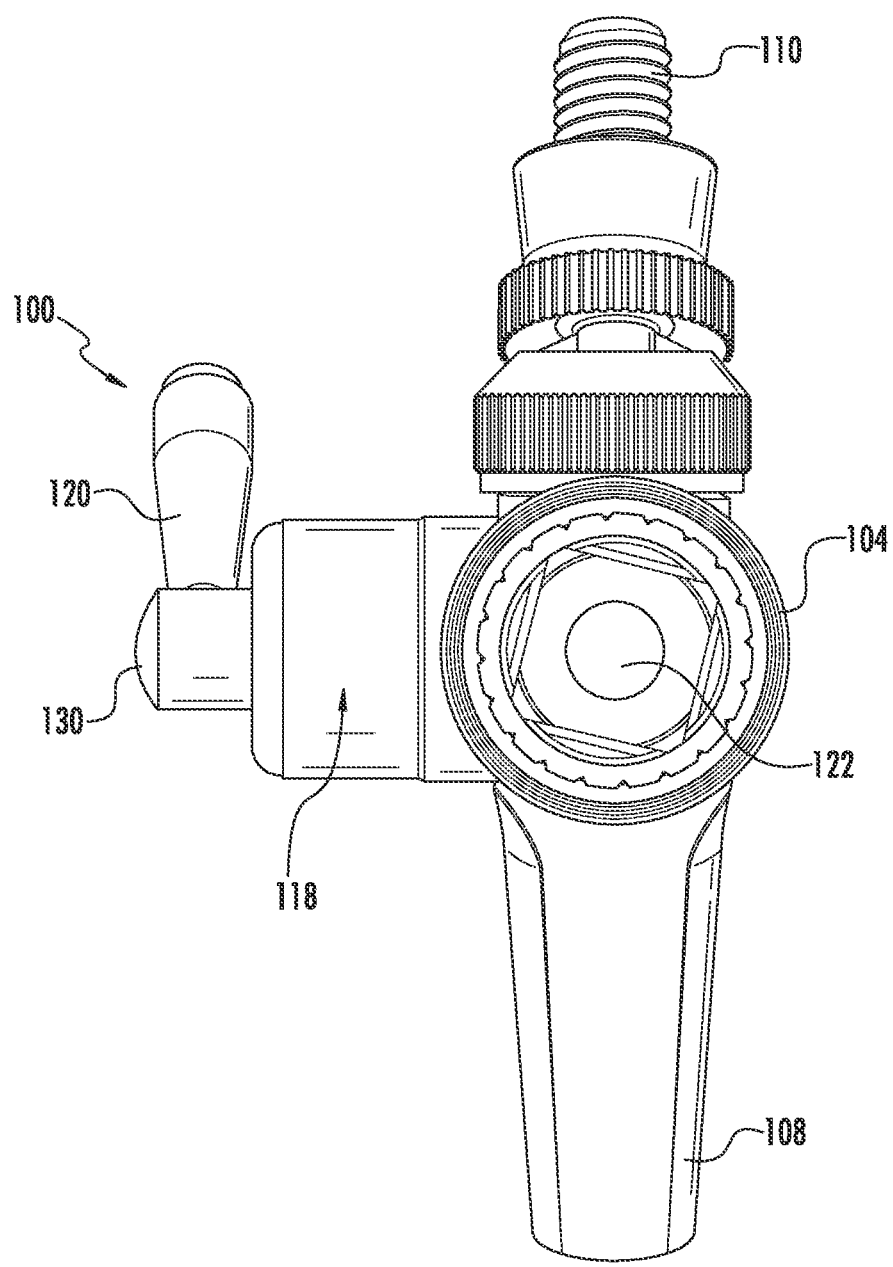
FIG. 6 is a rear view of the faucet of FIG. 1.
Figure 7:
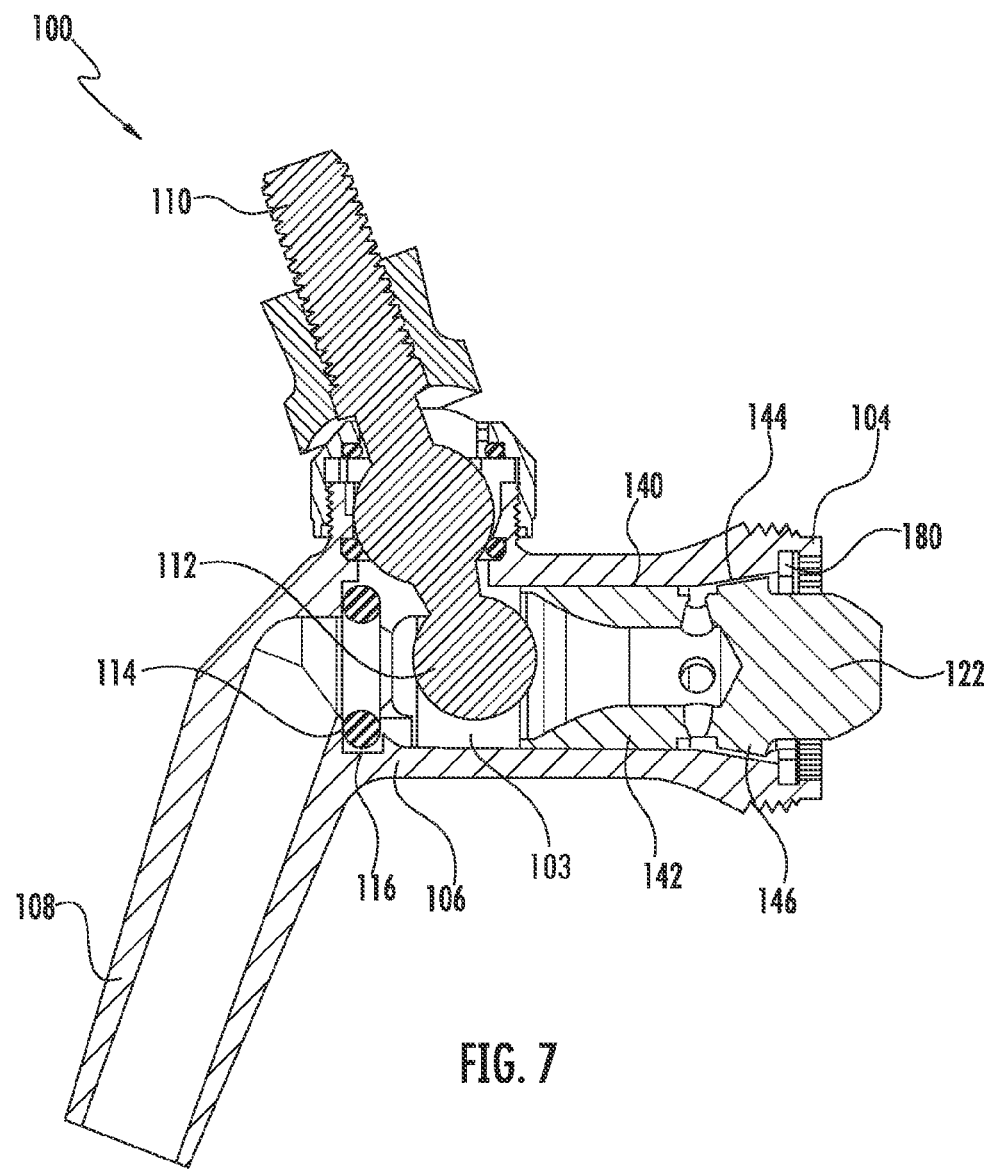
FIG. 7 is aside cross-sectional view of the faucet of FIG. 1.

Reference will now be made in detail to exemplary aspects of the present invention which are illustrated in the accompanying drawings. Wherever possible, the same reference numbers will be used throughout the drawings to refer to the same or like parts.

FIGS. 1 to 7 illustrate a faucet 100 according to the present disclosure including an integral flow reducer. Faucet 100 may include a body 102 having a first end 104 for mounting the faucet to fixture providing a source of a pressurized liquid beverage, and a second end 106 with an integral or removable spout 108 through which the beverage may be dispensed. The flow of the liquid through an interior 103 of body 102 may be controlled by a lever 110 extending from the body. Lever 110 may include a lower end 112 that forms a seal against a sealing member 114 that is positioned within a seat 116 adjacent second end 106.

As disclosed in commonly-owned U.S. Published patent application, Publication No. 2007/0194264, the disclosure of which is incorporate herein by reference, lower end 112 of lever 110 is movable between an open and a closed position with respect to sealing member 114 to either permit or prevent the liquid from flowing through faucet 100. Seat 116 is preferably sized to be substantially larger that sealing member 114 so that when the liquid is flowing through faucet 100 and out spout 108, the liquid may move about all sides of sealing member 114. Also note that by having the lower end of lever 110 directly engage sealing member 114, there is no need for conventional slider assemblies that might be found in other front sealing faucets. This leaves space within body 102 of faucet 100 that would otherwise be dedicated to providing for movement of the slider makes or breaks engagement with a sealing member/seat combination to prevent or permit flow of a beverage through the conventional faucet.

Faucet 100 may also include a flow reducer 118 with a flow control lever 120 extending outside of body 102 and a flow reducing insert 122 positioned within body 102. Lever 120 may be connected to a shaft 130 extending through an opening 132 in body 102 so that movement of lever 120 through an arc serves to rotate shaft within opening 132. Shaft 130 may include an eccentrically mounted pin 124 on an inner end 126 that engages an opening 128 of insert 122. Having pin 124 eccentrically positioned allows movement of lever 120 in an arc to move insert 122 laterally within body 102. A plurality of O-rings 134 may be provided between body 102 and shaft 130 to allow rotation of the shaft without permitting liquid from within the body to exit through opening 132.

Figure 19:
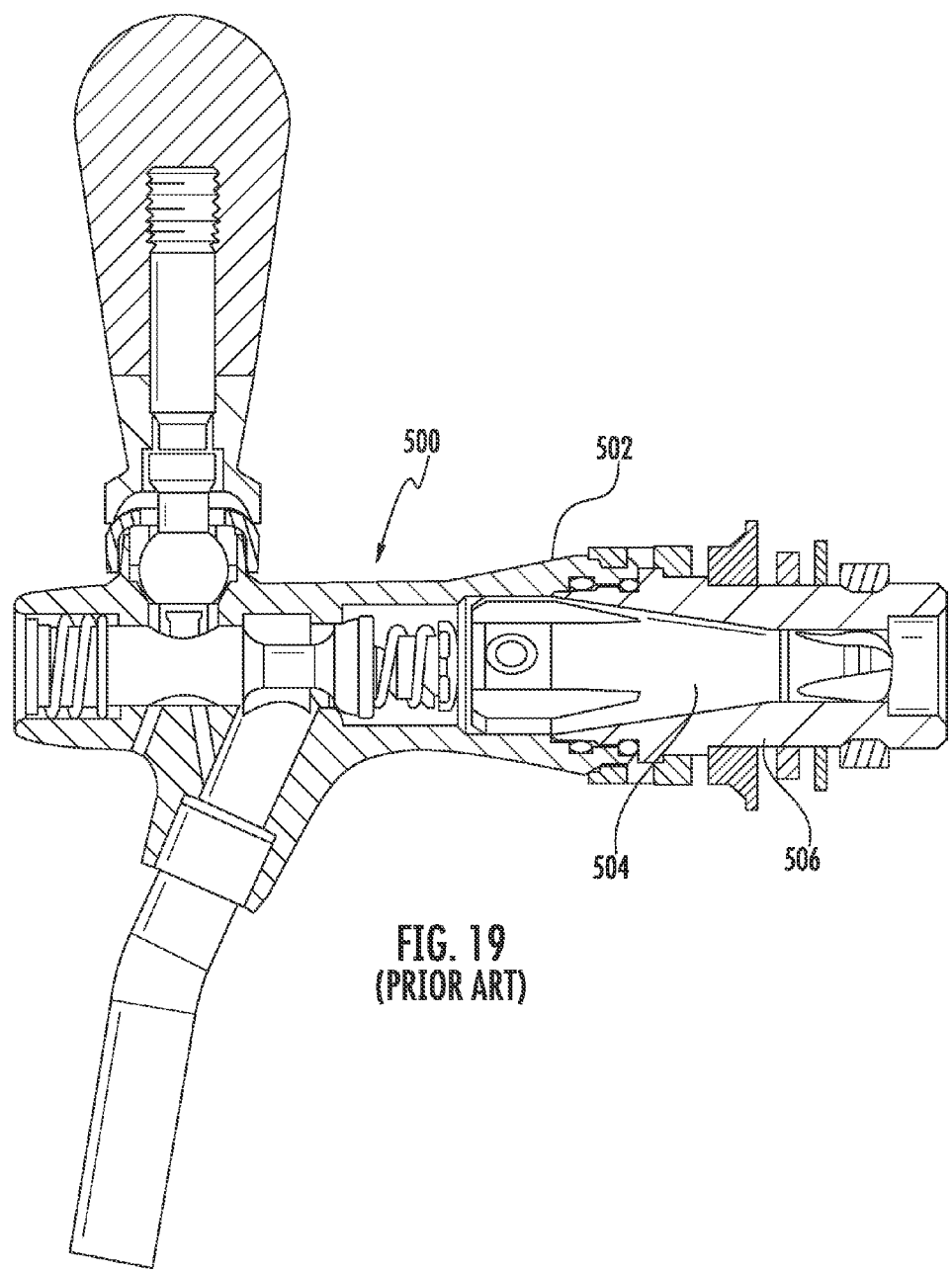
FIG. 19 is a side cross-sectional view of a prior art beverage faucet with an integral flow reducer and mating shank.

Interior 103 of body 102 includes a portion with straight walls 140 into which a straight portion 142 of insert 122 may be inserted. Straight portion 142 is preferably closely matched in size to straight walls 140 so that insert 122 may easily move laterally and rotate within the interior while still being securely positioned within the body. With conventional flow reducing inserts (such as shown in FIG. 19), it has been observed that having an insert that is not closely sized to the adjacent walls, such as straight walls 140 and straight portion 142, may permit the insert to vibrate or move transverse to the direction of flow, within the interior of the faucet body when liquid is flowing through the faucet. Such vibration of the insert may result in the liquid flowing at variable rates about the insert as the gap between insert and body changes. This vibration may adversely affect the condition of the liquid being dispensed by the faucet. The inclusion of tapered and straight portions of insert 122 helps address the possible vibration or movement of the insert transverse to the direction of flow, by keeping at least a portion of the insert in close proximity to a portion of the interior of body 102 and preventing the vibration of insert 122 within body 102. The close proximity of the straight wall portion and the straight portion of the body and the insert, respectively, will permit movement of the insert upstream or downstream along the direction of flow between the inlet and the outlet without permitting undesirable transverse movement of the insert.

Interior 103 also includes a portion with tapered walls 144 within which a tapered portion 146 of insert 122 may be positioned. Tapered walls 144 and tapered portion 146 are preferably closely matched in size and shape so that when insert 122 is moved sufficient toward second end 106, flow of liquid through body 102 may be restricted as the tapered portion moves closer to the tapered walls or stopped completely when the tapered portion engages the tapered walls. When tapered wall 144 and tapered portion 146 not engaged to stop flow through the faucet, a gap 180 may be defined between the insert and the body for liquid to flow through.

Movement of insert 122 upstream such the tapered portion does not engage the tapered walls permits flow of the liquid through the faucet. Movement of insert 122 downstream such that the tapered portion moves toward the tapered walls will tend to limit the ability of the liquid to flow through the faucet. Movement of insert 122 downstream such that the tapered portion engages the tapered walls will cut off flow of the liquid through the faucet. These movements of insert 122 laterally within interior 103 of faucet body 102 may be controlled by movement of lever 120 which in turn rotates shaft 130 and thus eccentric pin 124 within opening 128 of insert 122. Thus, movement of lever 120 may be used to control the amount of liquid permitted to flow through body 102 when lever 110 disengages sealing member 114.

Tapered portion 146 and tapered walls 144 are configured with a narrower end within interior 103 and widening toward first end 104 of body 102. This configuration permits easy assembly and disassembly of faucet 100. Once pin 124 is removed from engagement of opening 128, insert 122 may be simply slid out of interior 103 through first end 104. Forming of tapered walls 144 within interior 103 is also simplified as a mold or tool may be inserted easily through first end 104 since the wider end is directed toward the first end.

The engagement of the tapered walls and tapered portion to stop flow through faucet 100 may also serve as a inward movement limiter or stop preventing further insertion of insert 122 toward lever 110. This may prevent insert 122 being positioned in such a location that movement of lever 110 or end 112 is restricted. An outward movement limiter or stop is not needed as pin 124 will prevent insert 122 from moving outside of body 102 when the faucet is not mounted to a shank at a serving location. Once mounted to a serving location, liquid pressure and the shank will further serve to limit movement of the insert outside of body 102.

FIGS. 20 and 21 illustrate faucet 100 with insert 122 having tapered portion 146 moved away from engagement with tapered walls 144 so that liquid can flow through gap 180 defined therebetween. In these FIGS., faucet 100 and the flow reducing elements thereof are in an open position. This open position of the flow reducing elements does not refer to the position of lever 110. FIGS. 22 and 23 illustrate faucet 100 with insert 122 having tapered portion 146 fully engaged with tapered walls 144 within body 102, completely shutting off flow of liquid through faucet 100. In these FIGS., faucet 100 and the flow reducing elements thereof are in a closed position. This closed position of the flow reducing elements does not refer to the position of lever 110.

Figure 8:
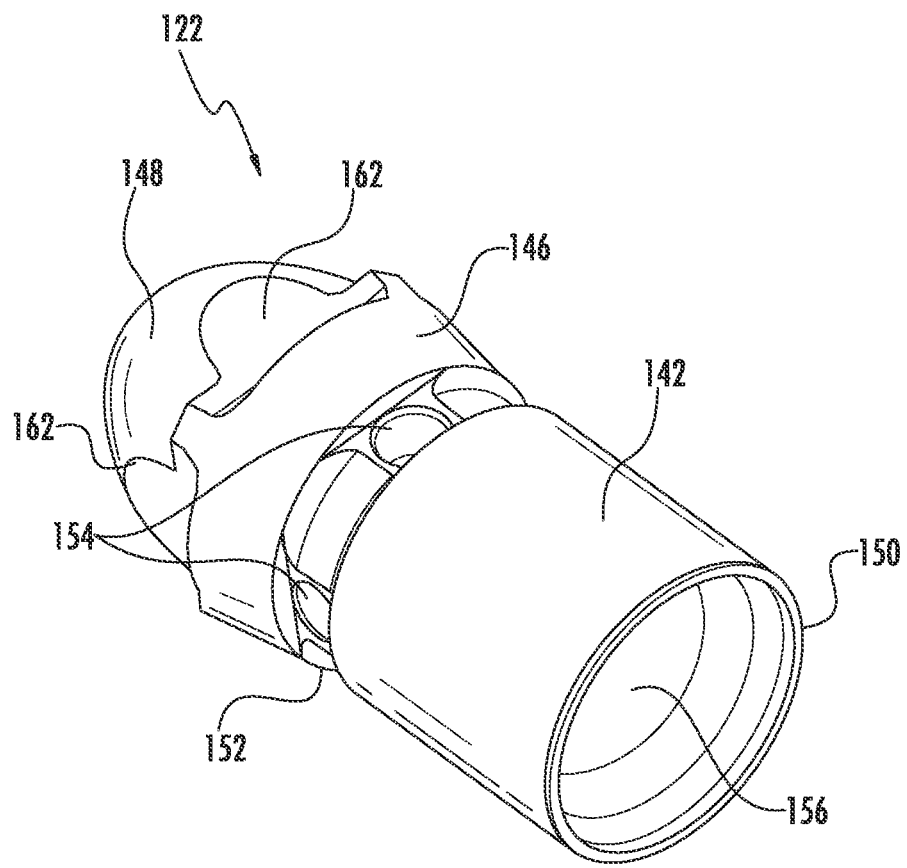
FIG. 8 is a side perspective view of a flow reducer insert of the faucet of FIG. 1.
Figure 9:
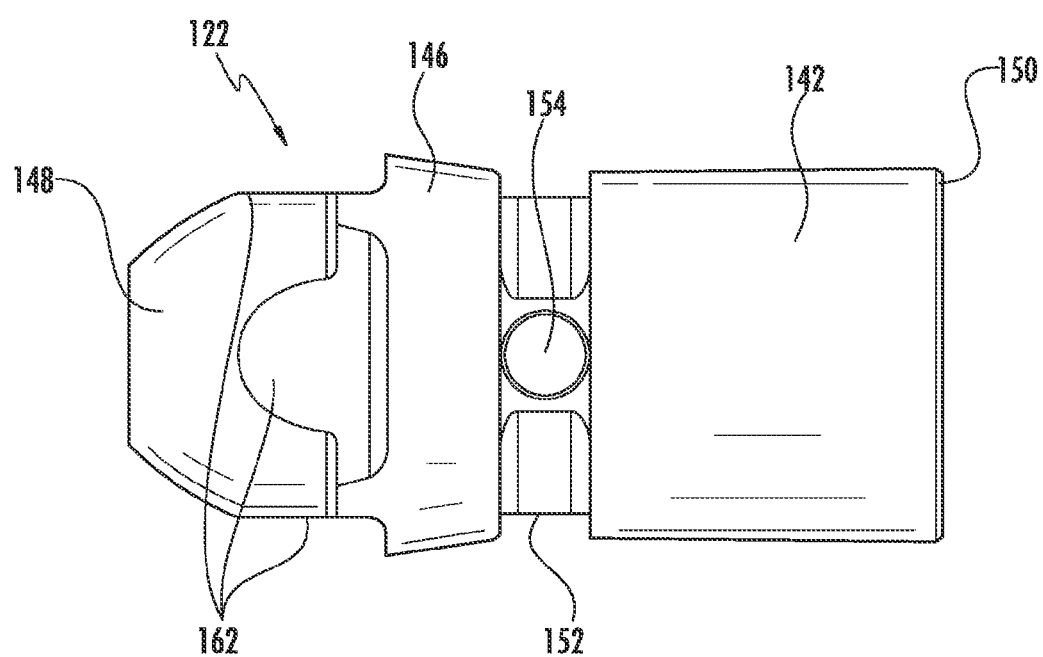
FIG. 9 is a side view of the insert of FIG. 8.

Referring now to FIGS. 8 and 9, insert 122 includes straight portion 142 and tapered portion 146 between an upstream end 148 and a downstream end 150. Upstream end 148 is preferably shaped to smooth flow of liquid as it approaches the wider tapered portion 146. Once liquid had passed through a space between tapered portion 146 and tapered walls 144, the liquid will end a circumferential groove 152 where it is allowed to pass through a plurality of openings 154 and into an inner opening 156 and further into interior 103 of body 102 to flow through second end 106 of faucet 100. Straight portion 142 and straight walls 140 are preferably closely matched in size so that the liquid flow route through groove 152, openings 154 and inner opening 156 will permit easy flow of liquid through faucet 100. The number of openings 154 and the size and depth of groove 152 may be selected based on the nature of liquid to be dispensed by faucet 100 and may be sized relative to the overall size of faucet 100 and the flow that faucet 100 is designed to achieve.

Figure 10:
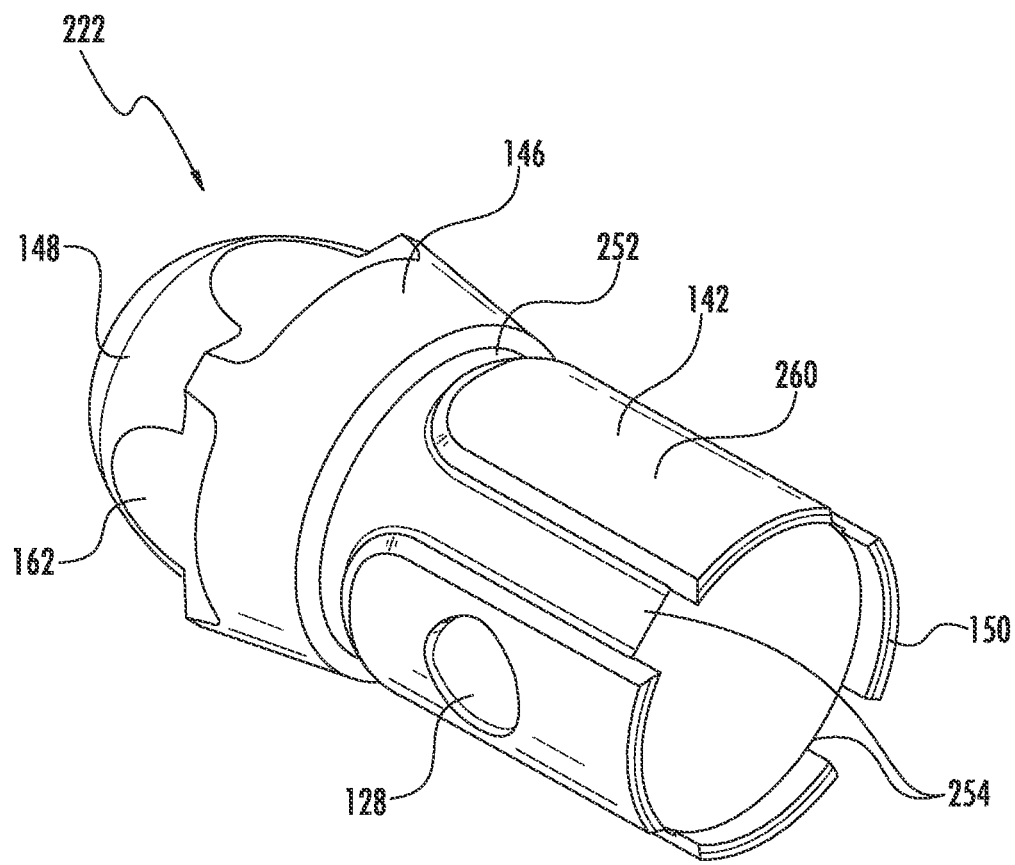
FIG. 10 is a side perspective view of a first alternative embodiment of an insert for use with the faucet of FIG. 1.
Figure 11:
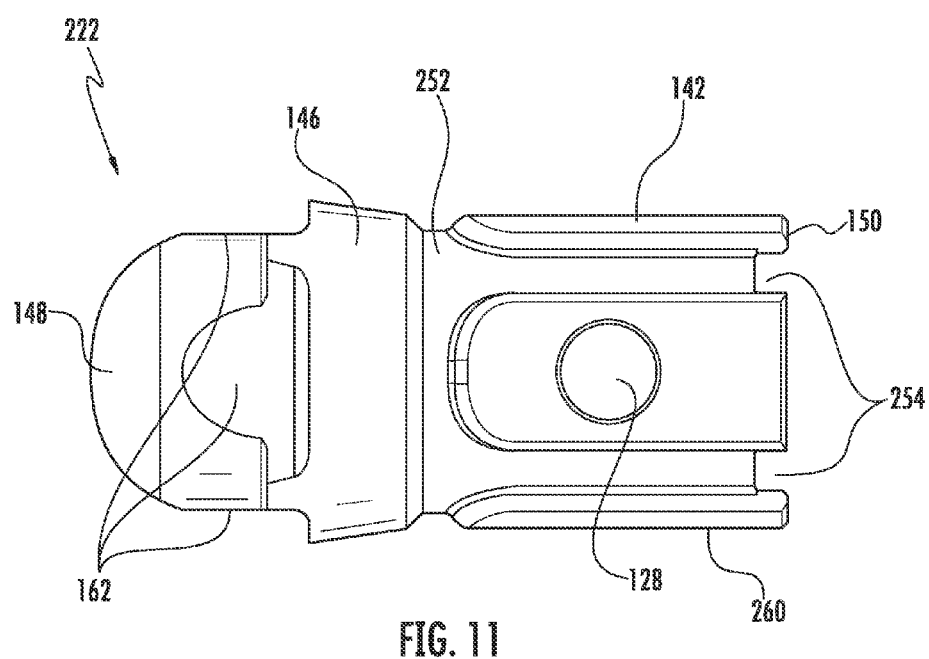
FIG. 11 is a side view of the insert of FIG. 10.

FIGS. 10 and 11 illustrate a first alternative embodiment of an insert 222 which is configured to fit within interior 103 and engage pin 124 within opening 128 to reduce flow through faucet 100. Insert 222 also includes upstream end 148, tapered portion 146 and straight portion 142. Insert 222 permits liquid passing over tapered portion 146 to flow into a circumferential groove 252 and then along a plurality of channels 254 extending along an outer surface 260 of the insert. Although insert 222 does not permit liquid to flow through an inner opening or an interior space of the insert, insert 222 may be configured as a solid body or may be hollow but not include any openings through which the liquid may pass into the hollow core.

Figure 12:
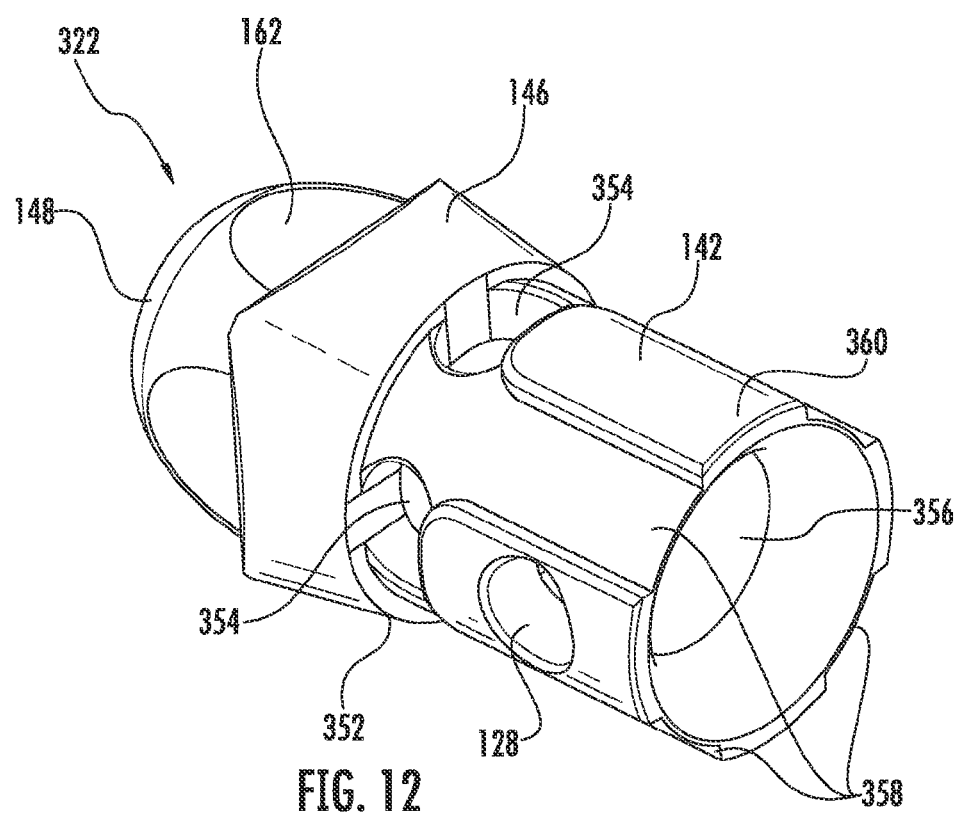
FIG. 12 is a side perspective view of second alternative embodiment of an insert for use with the faucet of FIG. 1.
Figure 13:
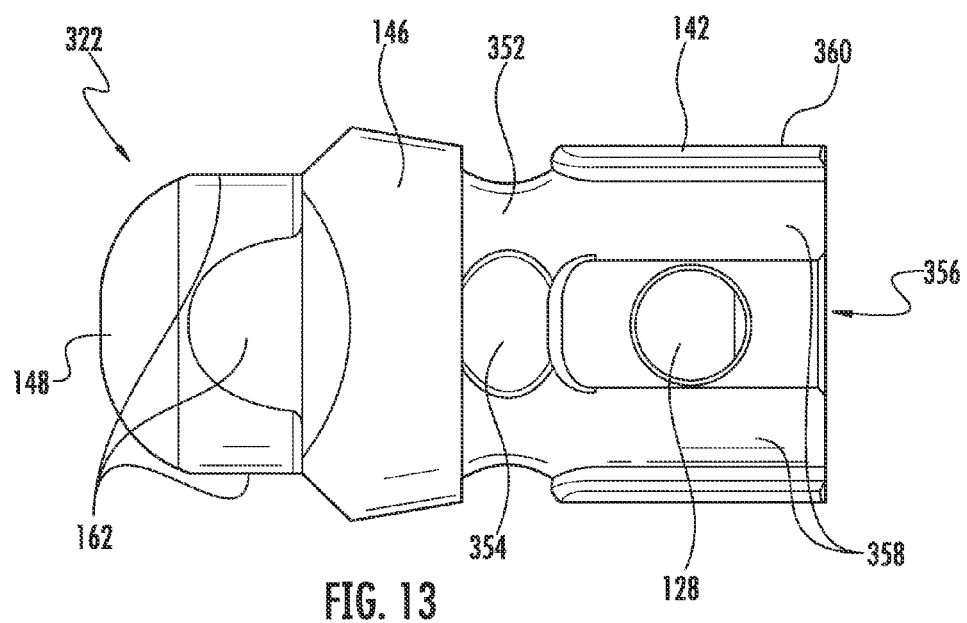
FIG. 13 is a side view of the insert of FIG. 12.
Figure 14:
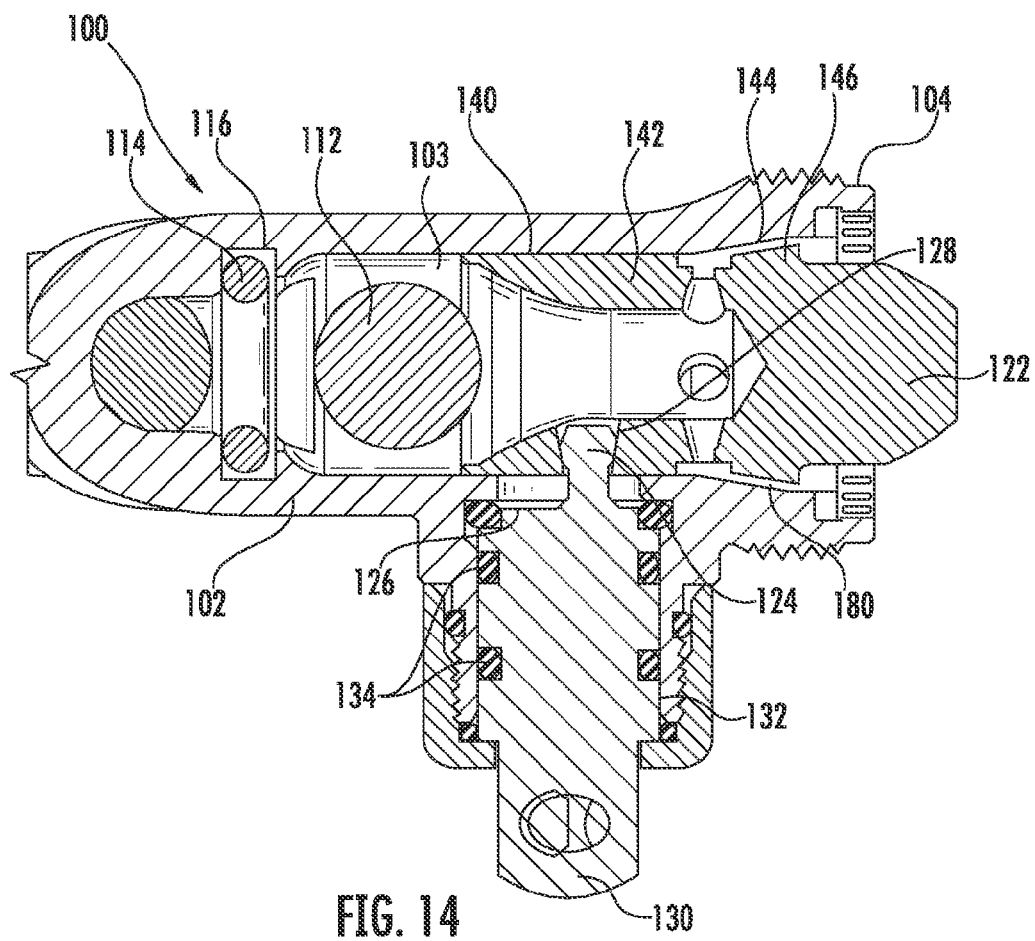
FIG. 14 is a top cross-sectional view of the faucet body of FIG. 1.
Figure 15:
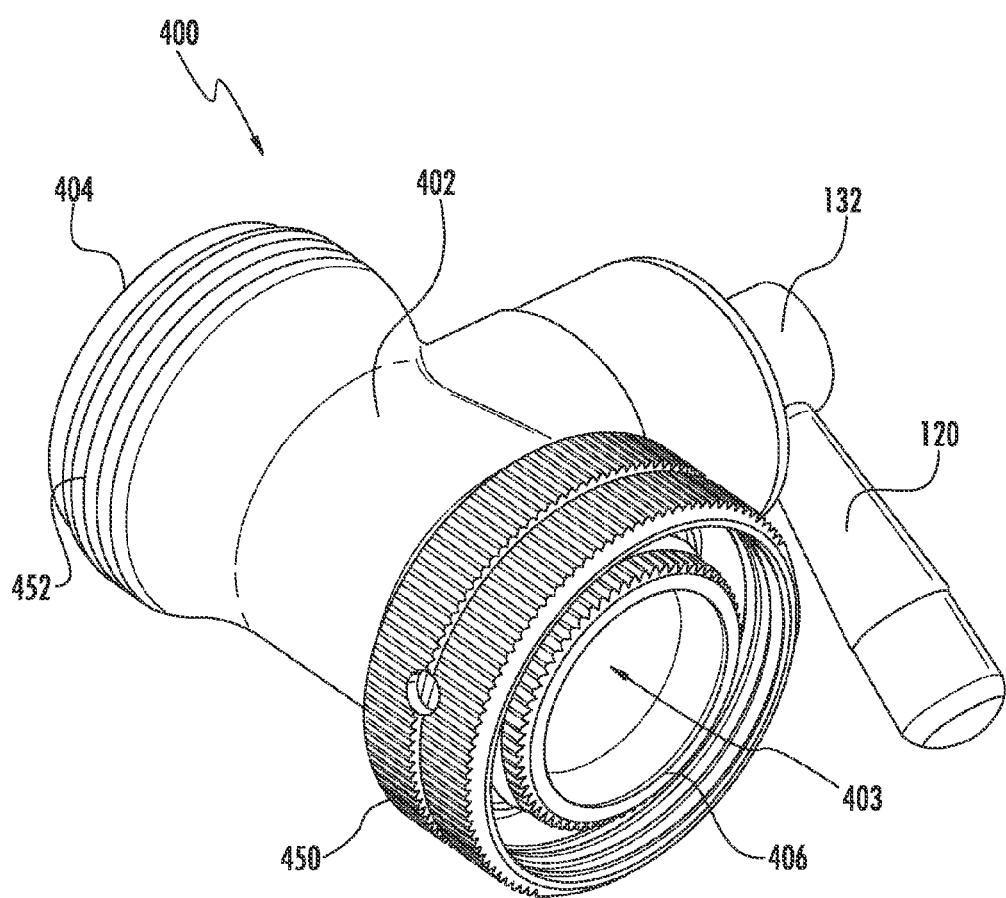
FIG. 15 is a side perspective view of a flow reducer according to the present disclosure.
Figure 16:
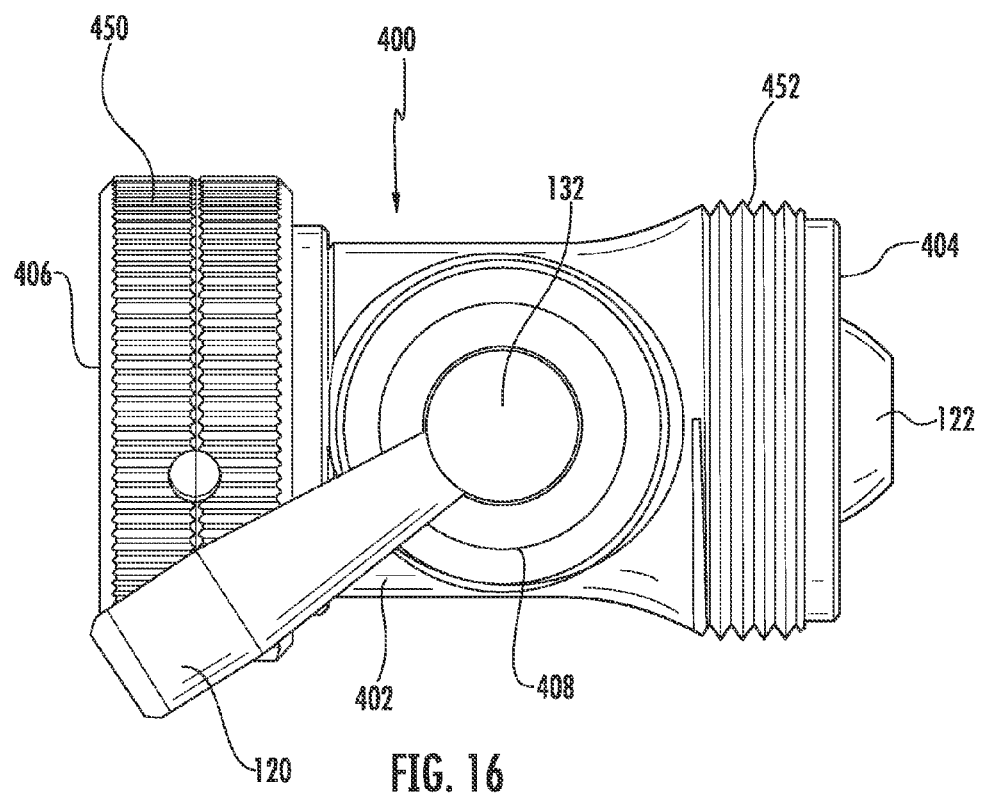
FIG. 16 is a side view of the flow reducer of FIG. 15.
Figure 17:
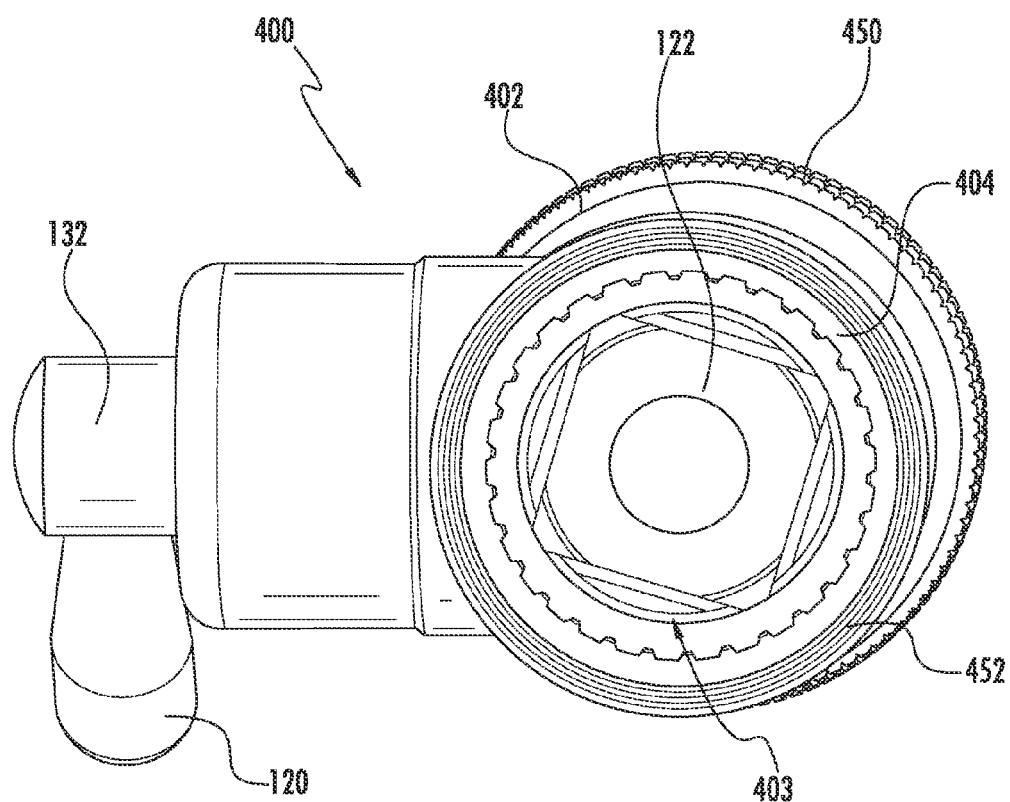
FIG. 17 is a rear view of the flow reducer of FIG. 15.
Figure 18:
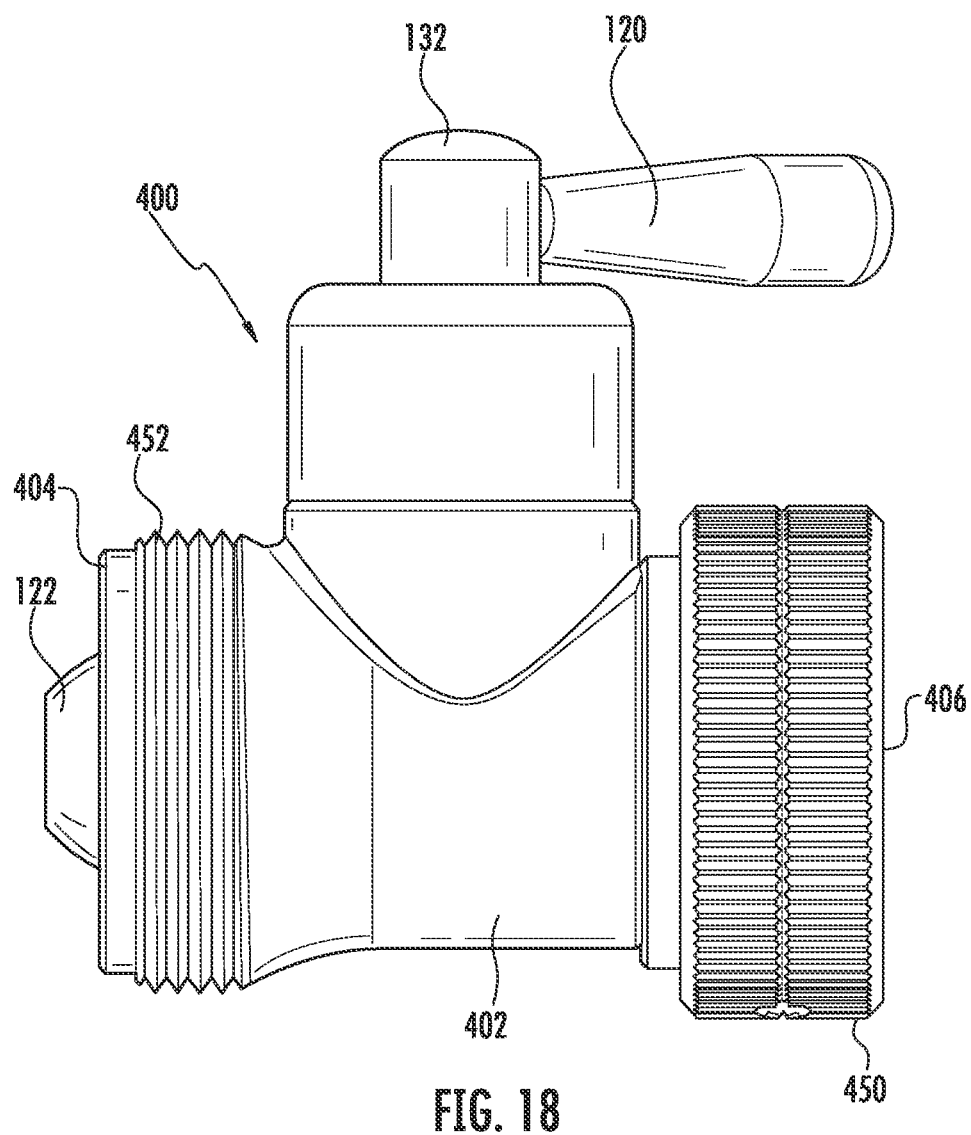
FIG. 18 is a top view of the flow reducer of FIG. 15.

FIGS. 12 and 13 illustrate a second alternative embodiment of an insert 322 which is configured to fit within interior 103 and engage pin 124 to reduce flow through faucet 100. Insert 322 also includes upstream end 148, tapered portion 146 and straight portion 142. Insert 322 permits liquid passing over tapered portion 146 to flow into a circumferential groove 352 and then through both openings 354 into an inner opening 356 as well as through channels 358 along an outer surface 360 of the insert.

On each of the insert embodiments illustrated above, one or more pairs of flats 162 may be provided in the upstream end of the insert to aid in grasping and removing the insert from the interior of the body.

FIGS. 15 to 18 illustrate a flow reducer 400 for use with existing faucets. Reducer 300 includes a body 402 an interior 403 and a first or upstream end 404 and a second or downstream end 406. Extending through an opening 408 in body 402 is shaft 130 to which is connected lever 120. Within interior 403 is mounted insert 122 which is engaged by shaft 130 and pin 124 as described above. Interior 403 is configured with mating straight walls and tapered walls, as described above, to cooperate with inserts 122, 222 and 322 to reduce or stop liquid flow through reducer 400.

On an exterior of flow reducer 400 adjacent second end 406 may be mounted a mounting arrangement 450 to aid in the mounting of a faucet downstream of the flow reducer. Such a mounting arrangement may conform to an industry standard for shanks to which faucets are typically mounted or may conform to a proprietary standard. On an exterior of flow reducer 400 adjacent first end 404 may be formed threads 452 that permit flow reducer 400 to be mounted to a shank configured for connection of a standard faucet. Alternatively, threads 452 may conform to a proprietary standard.

Compared to conventional flow reducers, insert 122 is substantially shorter (compare to a conventional insert illustrated in FIGS. 19 and 20, below), permitting reducer 400 to be substantially shorter. This shorter length permits retrofitting of faucets to include flow reducers without undesirably and radically changing the distance the faucet extends from the mounting shank.

Also, as compared to conventional inserts and mating bodies, insert 122 and body 402 have much shorter mating surfaces, which may reduce the effort require to form, shape or mold the elements making up the flow reducer, providing a reduced cost to manufacture. Note also that the conventional flow reducing insert (as shown in FIG. 20) is configured with a narrower end positioned upstream and a wider end downstream. Inserts according the present disclosure are configured with a wider end upstream and a narrower end downstream. Any pressure from the liquid acting on the insert of the present disclosure would tend to push the insert further closed and slow flow through the reducer. The conventional insert would tend to be moved open by such liquid pressure, allowing greater flow and possibly allowing the liquid, for example, beer, to break as it is dispensed, resulting in an undesirably foamy product being dispensed.

FIG. 19 illustrates a prior art faucet 500 with a conventional flow reducer 504 positioned partially within a faucet body 502 and partially within a faucet mounting shank 506. To be able to mount this conventional faucet with an integral flow reducer, a mating shank must be included in the serving tower. A standard shank mounted to the serving tower would permit the use of a flow reducing faucet except where the flow reducer is mounted as a separate element between a standard faucet and a standard faucet mounting shank. As noted above, such a flow reducer arrangement with the longer conventional flow reducer insert 504 would result in an undesirably long extension beyond the serving tower. Either of these approaches are less than optimal in terms of adapting existing beverage serving towers to mount a faucet and a flow reducer.

The embodiments of the inventions disclosed herein have been discussed for the purpose of familiarizing the reader with novel aspects of the present invention. Although preferred embodiments have been shown and described, many changes, modifications, and substitutions may be made by one having skill in the art without unnecessarily departing from the spirit and scope of the present invention. Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:

1. A faucet for dispensing pressurized liquids, the faucet comprising:
    a body with a first end and a second end, the body defining an interior extending between the first and second ends;
    a lever extending into the interior through the body between the first and second ends, a lower end of the lever within the interior;
    the lower end of the lever configured to engage a sealing member adjacent the second end to prevent flow of the liquid through the faucet, the sealing member also engaging a seat within the cavity;
    the seat larger than the sealing member, so that when the lower end of the lever is disengaged from the sealing member to permit flow of the liquid through the faucet, the liquid may flow about the sealing member as it flows through the second end of the body;
    a flow reducing insert positioned within the interior adjacent the first end of the faucet, the flow reducing insert having a tapered portion with a wider end upstream and a narrower end downstream and a straight portion extending downstream from the tapered portion, the interior having a tapered wall adjacent the tapered portion and a straight wall adjacent the straight portion;
    a shaft extending through a side of the faucet body having an eccentrically mounted pin engaging the insert, the shaft being rotatable such that the pin moves the insert laterally within the interior, and a handle on the outer portion of the shaft to aid in rotation of the shaft;

the insert configured such that movement of the insert laterally upstream will permit liquid to pass through the first end between the tapered portion and the tapered wall toward the second end and movement of the insert laterally downstream such that the tapered portion engages the tapered wall will prevent flow of the liquid through the faucet.

2. The faucet of claim 1, the insert further comprising a hollow downstream end and a plurality of openings extending into the hollow end of the insert so that liquid passing between the tapered wall and tapered portion will enter the openings and flow into the hollow end of the insert before flowing through the faucet toward the second end.

3. The faucet of claim 2, the insert further comprising the openings extending through the insert in the straight portion of the insert.

4. The faucet of claim 2, the insert further comprising a circumferential groove about the insert downstream of the tapered portion with the openings formed within the groove so that liquid flowing between the tapered portion and the tapered wall will be collected in the groove and directed to the openings.

5. The faucet of claim 4, further comprising the groove is about the straight portion of the insert.

6. The faucet of claim 1, the insert further comprising a plurality of channels in the straight portion extending downstream from the tapered portion, the channels permitting liquid passing between the tapered wall and the tapered portion to flow through the faucet body toward the second end.

7. The faucet of claim 6, the insert further comprising a circumferential groove about the insert downstream from the tapered portion and upstream from the channels, the groove positioned to collect liquid from between the tapered portion and the tapered wall and direct the liquid into the channels.

8. The faucet of claim 7, further comprising the groove formed in the straight portion of the insert.

9. The faucet of claim 1, the insert further comprising a hollow end and a plurality of openings extending into the hollow end through the straight portion of the insert, and a plurality of channels along the straight portion of the insert.

10. The faucet of claim 9, the insert further comprising a circumferential groove about the insert so that liquid passing between the tapered wall and the tapered portion will collect within the groove, the openings formed in the groove and the channels extending downstream from the groove.

11. The faucet of claim 10, further comprising the groove positioned within the straight portion of the insert.

12. A flow reducer for a faucet dispensing pressurized liquid, the flow reducer comprising:
a body with an interior having a first upstream end and a second downstream end, the interior including a tapered wall portion adjacent the first end and a straight portion downstream from the tapered wall;
an insert positioned within the interior, the insert comprising a straight portion sized to fit within and closely match the size of the straight wall of the body, and a tapered portion sized to fit within and closely match the tapered wall of the body;
a shaft extending through the body to engage the insert with an eccentrically positioned pin received within an opening of the insert, wherein rotation of the shaft will result in lateral movement of the insert within the interior, the shaft accessible outside of the body;
wherein the tapered portion of the insert includes a wider end upstream and a narrower end downstream and the straight portion extends from the narrower end of the tapered portion;
wherein movement of the insert upstream within the interior will move the tapered portion away from the tapered wall and provide a gap between the tapered portion and the tapered wall for liquid to flow through the body from the first end toward the second end; and,
wherein rotation of the shaft may be used to select the size of the gap between the tapered portion and the tapered wall to select a desired flow rate of liquid through the body.

13. The flow reducer of claim 12, the insert further comprising a hollow downstream end and a plurality of openings extending into the hollow end of the insert so that liquid passing between the tapered wall and tapered portion will enter the openings and flow into the hollow end of the insert before flowing through the body toward the second end.

14. The flow reducer of claim 13, the insert further comprising the openings extending through the insert in the straight portion of the insert.

15. The flow reducer of claim 13, the insert further comprising a circumferential groove about the insert downstream of the tapered portion with the openings formed within the groove so that liquid flowing between the tapered portion and the tapered wall will be collected in the groove and directed to the openings.

16. The flow reducer of claim 15, further comprising the groove is about the straight portion of the insert.

17. The flow reducer of claim 12, the insert further comprising a plurality of channels in the straight portion extending downstream from the tapered portion, the channels permitting liquid passing between the tapered wall and the tapered portion to flow through the body toward the second end.

18. The flow reducer of claim 17, the insert further comprising a circumferential groove about the insert downstream from the tapered portion and upstream from the channels, the groove positioned to collect liquid from between the tapered portion and the tapered wall and direct the liquid into the channels.

19. The flow reducer of claim 18, further comprising the groove formed in the straight portion of the insert.

20. The flow reducer of claim 12, the insert further comprising a hollow end and a plurality of openings extending into the hollow end through the straight portion of the insert, and a plurality of channels along the straight portion of the insert.

21. The flow reducer of claim 20, the insert further comprising a circumferential groove about the insert so that liquid passing between the tapered wall and the tapered portion will collect within the groove, the openings formed in the groove and the channels extending downstream from the groove.

22. The flow reducer of claim 21, further comprising the groove positioned within the straight portion of the insert.

23. The flow reducer of claim 12, wherein the body is a faucet body and the flow reducer is integrated into a faucet.

24. The flow reducer of claim 12, wherein on an exterior adjacent the first end is a mounting arrangement for mounting the flow reducer to a faucet shank, and on the exterior adjacent the second end are threads configured to mount a faucet to the flow reducer.

25. A faucet for dispensing pressurized liquids, the faucet comprising:
a body with a first end and a second end, the body defining an interior extending between the first and second ends;
a lever extending into the interior through the body between the first and second ends, a lower end of the lever within the interior, the lower end of the lever configured to directly engage a sealing member adjacent the second end to prevent flow of the liquid through the faucet, the sealing member also engaging a seat within the cavity;

the seat larger than the sealing member, so that when the lower end of the lever is disengaged from the sealing member to permit flow of the liquid through the faucet, the liquid may flow about the sealing member as it flows through the second end of the body;

a flow reducing insert positioned within the interior adjacent the first end of the faucet and upstream of the lower end of the lever, the insert configured such that movement of the insert laterally will permit adjustment of the amount of liquid able to pass through the first end toward the second end;

a shaft extending through a side of the faucet body having an eccentrically mounted in engaging the insert, the shaft being rotatable such that the pin moves the insert laterally within the interior, and a handle on the outer portion of the shaft to aid in rotation of the shaft.

26. A flow reducing arrangement for a beverage faucet, the arrangement comprising:

a body with an interior, an inlet and an outlet, the interior having a straight wall portion and a tapered wall portion, the tapered wall portion positioned upstream from the straight wall portion and having a taper that is wider toward the inlet and narrower toward the straight wall portion;

a flow reducing insert positioned within the interior, the insert including a straight portion and a tapered portion, the tapered portion being wider toward the inlet and narrower toward the straight portion;

a shaft extending through the body and engaging the insert, the shaft having an eccentric pin engaging the insert so that rotation of the shaft will move the insert laterally within the interior between a closed position and an open position;

wherein the straight portion of the insert is sized so that the straight portion of the insert and the straight wall portion of the body remain adjacent to each other as the insert moves between the closed and open positions; and wherein the tapered portion of the insert is in contact with the tapered wall portion of the body when the insert is in the closed position and a gap is defined between the tapered portion of the insert and the tapered wall portion of the body when the insert is in the open position, and the straight wall portion of the body and the straight portion of the insert.

\* \* \* \* \*